United States Patent
Wu

(10) Patent No.: US 8,205,531 B2
(45) Date of Patent: Jun. 26, 2012

(54) CHUCK DEVICE AND MACHINE TOOL HAVING THE SAME

(76) Inventor: Hsuan-Lung Wu, Taichung (TW)

( * ) Notice: Subject to any disclaimer, the term of this patent is extended or adjusted under 35 U.S.C. 154(b) by 423 days.

(21) Appl. No.: 12/638,389

(22) Filed: Dec. 15, 2009

(65) Prior Publication Data

US 2011/0094357 A1    Apr. 28, 2011

(51) Int. Cl.
     *B23B 15/00*      (2006.01)
     *B23B 31/12*      (2006.01)

(52) U.S. Cl. ............................................. 82/162; 82/157

(58) Field of Classification Search .................... 82/162, 82/157, 148, 142; 279/50, 137
See application file for complete search history.

(56) References Cited

U.S. PATENT DOCUMENTS

| | | | | |
|---|---|---|---|---|
| 3,921,993 A | * | 11/1975 | Ingham et al. ................... | 279/50 |
| 5,077,876 A | * | 1/1992 | McConkey .................... | 29/27 R |
| 5,170,686 A | * | 12/1992 | Schalles .......................... | 82/142 |
| 5,927,169 A | * | 7/1999 | Hinson ............................ | 82/163 |
| 6,123,000 A | * | 9/2000 | Stewart et al. ................... | 82/150 |
| 6,202,520 B1 | * | 3/2001 | Cardemon ...................... | 82/1.11 |
| 7,036,409 B2 | * | 5/2006 | Dunner .......................... | 82/162 |
| 2011/0094357 A1 | * | 4/2011 | Wu ................................ | 82/162 |

* cited by examiner

*Primary Examiner* — Will Fridie, Jr.
(74) *Attorney, Agent, or Firm* — Overhauser Law Offices LLC

(57) ABSTRACT

A chuck device for a machine tool includes: a center unit disposed in an axial hole in a tubular housing, extending along a hole axis of, and having a tip extending outwardly of the housing and abutting against a workpiece; a chuck unit disposed movably in the axial hole, sleeved on the center unit and including a chuck member disposed adjacent to the tip of the center unit; and a sleeve unit disposed movably in the axial hole, concentric with the housing and sleeved on the chuck unit. The sleeve unit has a pushing end portion sleeved on and abutting against the chuck member, and is operable to move relative to the housing along the hole axis such that the chuck member is driven by the pushing end portion of the sleeve unit with movement of the sleeve unit to move away from the housing and to clamp the workpiece.

8 Claims, 10 Drawing Sheets

CHUCK DEVICE AND MACHINE TOOL HAVING THE SAME

BACKGROUND OF THE INVENTION

1. Field of the Invention

The invention relates to a machine tool, more particularly to a machine tool including a chuck device.

2. Description of the Related Art

A conventional cutting machining apparatus includes: a machine bed; a driving unit disposed on the machine bed and having a chuck; and a positioning seat disposed on the machine bed and opposite to the driving unit and having a center. In use, the center of the positioning seat abuts against one end of a workpiece, and the chuck clamps the other end of the workpiece such that the driving unit drives the workpiece to rotate about a center axis of the chuck.

However, in such a configuration, prior to machining operation, alignment between the center of the positioning seat and the center axis of the chuck is required, thereby resulting in inconvenience during use.

It is noted that, when a workpiece is required to be fully machined, first, one end of the workpiece is clamped by the chuck such that the other end of the workpiece can be machined. Thereafter, said one end of the workpiece is detached from the chuck so that the other end of the workpiece is clamped by the chuck. Then, said one end of the workpiece can be machined. Therefore, when the workpiece is fully finished through twice undergoing the machining operation, manual detachment of the workpiece from the chuck is required, thereby resulting in inconvenience during use. Moreover, accuracy for the same workpiece cannot be ensured.

SUMMARY OF THE INVENTION

Therefore, an object of the present invention is to provide a chuck device and a machine tool having the same that can overcome the aforesaid drawbacks of the prior art.

According to one aspect of the present invention, a chuck device comprises:

a tubular housing formed with an axial hole that has a hole axis;

a center unit disposed in the axial hole in the tubular housing, extending along the hole axis, and having a tip extending outwardly of the tubular housing and adapted to abut against a center of an end of a workpiece;

a chuck unit disposed movably in the axial hole in the tubular housing, sleeved on the center unit, and including a chuck member disposed adjacent to the tip of the center unit; and a sleeve unit disposed movably in the axial hole in the tubular housing, concentric with the tubular housing and sleeved on the chuck unit, the sleeve unit having a pushing end portion sleeved on and abutting against the chuck member of the chuck unit.

The sleeve unit is operable to move relative to the tubular housing along the hole axis such that the chuck member of the chuck unit is driven by the pushing end portion of the sleeve unit with movement of the sleeve unit to move away from the tubular housing and to clamp the end of the workpiece.

According to another aspect of the present invention, a machine tool comprises:

a machine having first and second sides opposite to each other in a direction;

a first chuck device mounted on the first side of the machine, the first chuck device including a first tubular housing formed with a first axial hole that has a hole axis parallel to the direction, a first center unit disposed fixedly in the first axial hole in the first tubular housing, extending along the hole axis, and having a first tip extending outwardly of the first tubular housing and adapted to abut against a center of an end of a workpiece, a first chuck unit disposed movably in the first axial hole in the first tubular housing, sleeved on the first center unit, and including a first chuck member disposed adjacent to the first tip of the first center unit, and a first sleeve unit disposed movably in the first axial hole in the first tubular housing, concentric with the first tubular housing and sleeved on the first chuck unit, the first sleeve unit having a first pushing end portion sleeved on and abutting against the first chuck member of the first chuck unit, the first sleeve unit being operable to move relative to the first tubular housing along the hole axis such that the first chuck member of the first chuck unit is driven by the first pushing end portion of the first sleeve unit with movement of the first sleeve unit to move away from first tubular housing and to clamp the end of the workpiece; and a second chuck device mounted on the second side of the machine, the second chuck device including a second tubular housing formed with a second axial hole that has the hole axis, a second center unit disposed movably in the second axial hole in the second tubular housing, extending along the hole axis and having a second tip, the second center unit being operable to move relative to the second tubular housing along the hole axis between a normal position, where the second tip is spaced apart from the other end of the workpiece, and an abutting position, where the second tip moves away from the second tubular housing and toward the first chuck device so as to abut against a center of the other end of the workpiece;

a second chuck unit disposed movably in the second axial hole in the second tubular housing, sleeved on the second center unit, and including a second chuck member disposed adjacent to the second tip of the second center unit, and a second sleeve unit disposed movably in the second axial hole in the second tubular housing, concentric with the second tubular housing and sleeved on the second chuck unit, the second sleeve unit having a second pushing end portion sleeved on and abutting against the second chuck member of the second chuck unit, the second sleeve unit being operable to move relative to the second tubular housing along the hole axis such that the second chuck member of the second chuck unit is driven by the second pushing end portion of the second sleeve unit with movement of the second sleeve unit to move away from the second tubular housing and to clamp the other end of the workpiece.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
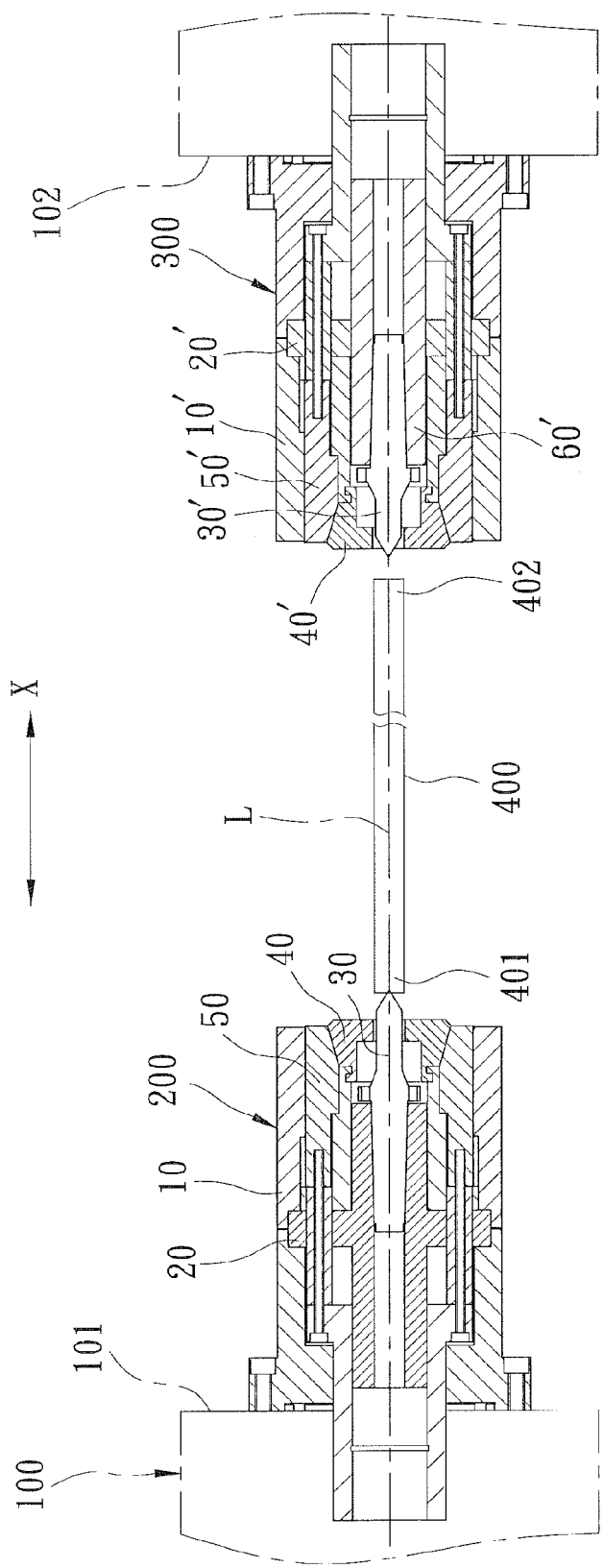
FIG. 1 is a fragmentary, partly schematic sectional view showing the preferred embodiment of a machine tool according to the present invention.

Referring to FIG. 1, the preferred embodiment of a machine tool for machining a workpiece 400 according to the present invention is shown to include a machine 100, a first chuck device 200, and a second chuck device 300.

The machine 100 has first and second sides 101, 102 opposite to each other in a direction (X).

Figure 2:
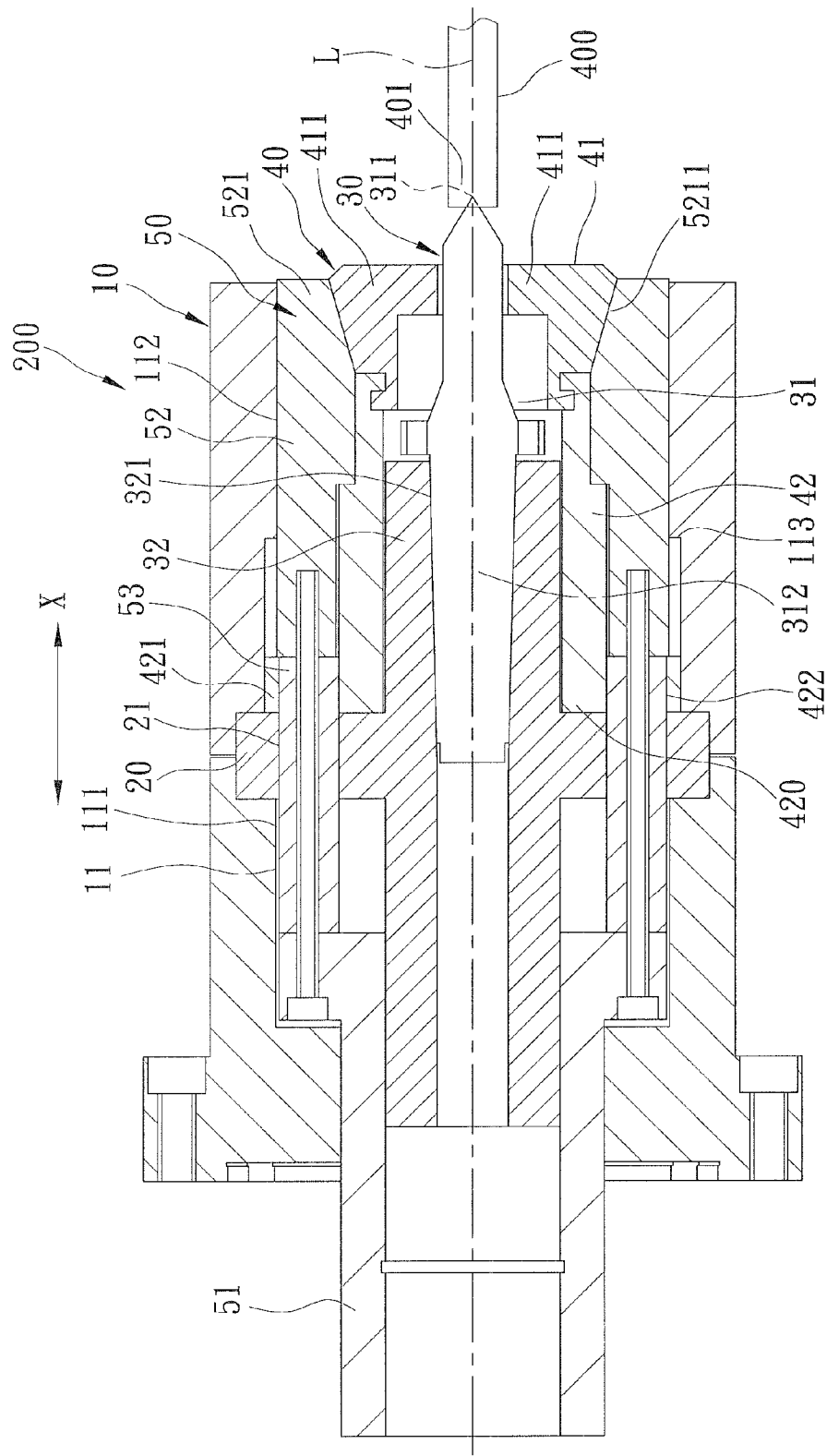
FIG. 2 is a schematic sectional view showing a first chuck device of the preferred embodiment when operated in a normal state.

Referring further to FIG. 2, the first chuck device 200 is mounted on the first side 101 of the machine 100, and includes a first tubular housing 10, a first positioning disc 20, a first center unit 30, a first chuck unit 40, and a first sleeve unit 50.

The first tubular housing 10 is formed with a first axial hole 11 that has a hole axis (L) parallel to the direction (X).

The first positioning disc 20 is disposed fixedly in the first axial hole 11 such that the first axial hole 11 is divided into a first hole portion 111 and a second hole portion 112 by the first positioning disc 20, is concentric with the first tubular housing 10, and is formed with a plurality of through holes 21. It is noted that the first tubular housing 10 has an annular inner surface defining the first axial hole 11 and having an annular shoulder portion 113 that is disposed in the second hole portion 112.

The first center unit 30 is disposed fixedly in the first axial hole 11, and extends along the hole axis (L). In this embodiment, the first center unit 30 includes a first center rod 31 and a first center-mounting seat 32. The first center-mounting seat 32 is in the form of an elongate tube body that is concentric with the first tubular housing 10, extends along the hole axis (L) through the first positioning disc 20 and is connected integrally to the first positioning disc 20. The first center rod 31 extends along the hole axis (L), and has a first tip 311 extending outwardly of the first tubular housing 10 and adapted to abut against a center of an end 401 of the workpiece 400, and a mounting end portion 312 opposite to the first tip 311 in the direction (X), and inserted into and engaging a tapered mounting hole 321 in the first center-mounting seat 32. As a result, the first center unit 30 is fixed in the first tubular housing 10.

The first chuck unit 40 is disposed movably in the second hole portion 112 of the first axial hole 11 in the first tubular housing 10, and is sleeved on the first center unit 30. The first chuck unit 40 includes a first chuck member 41 disposed around the first center rod 31 and adjacent to the first tip 311, and a driven sleeve 42 sleeved movably on the first center-mounting seat 32, i.e., the tube body, connected to the first chuck member 41, and having an end 420 distal from the first chuck member 41, and an annular flange 421 extending outwardly and radially from the end 420, and formed with a plurality of holes 422 corresponding respectively to the through holes 21 in the first positioning disc 20. In this embodiment, the first chuck member 41 includes a plurality of resilient jaw arms 411.

Figure 3:
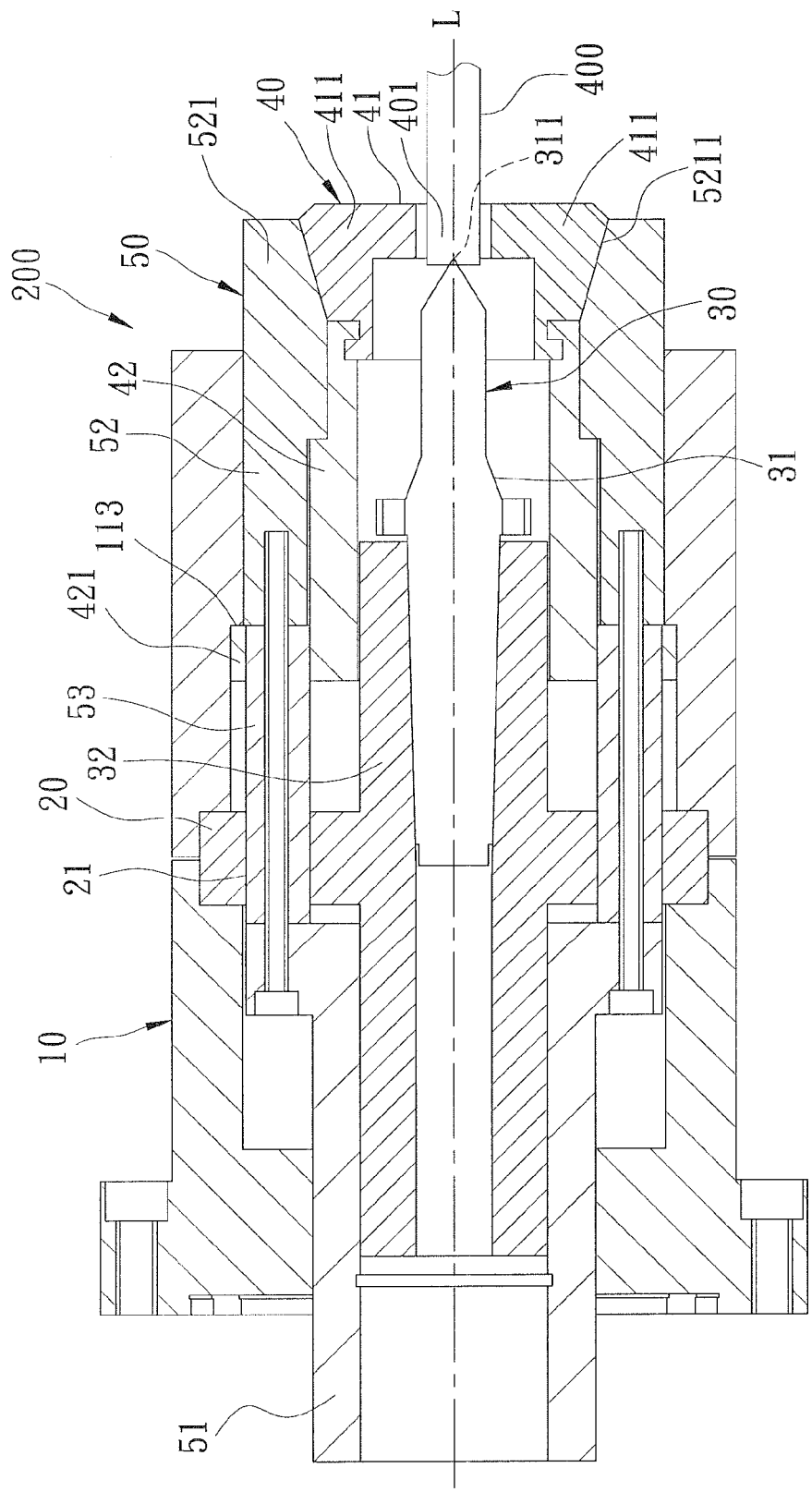
FIG. 3 is a schematic sectional view showing the first chuck device of the preferred embodiment when an assembly of a first chuck unit and a first sleeve unit of the first chuck device is moved toward a workpiece.
Figure 4:
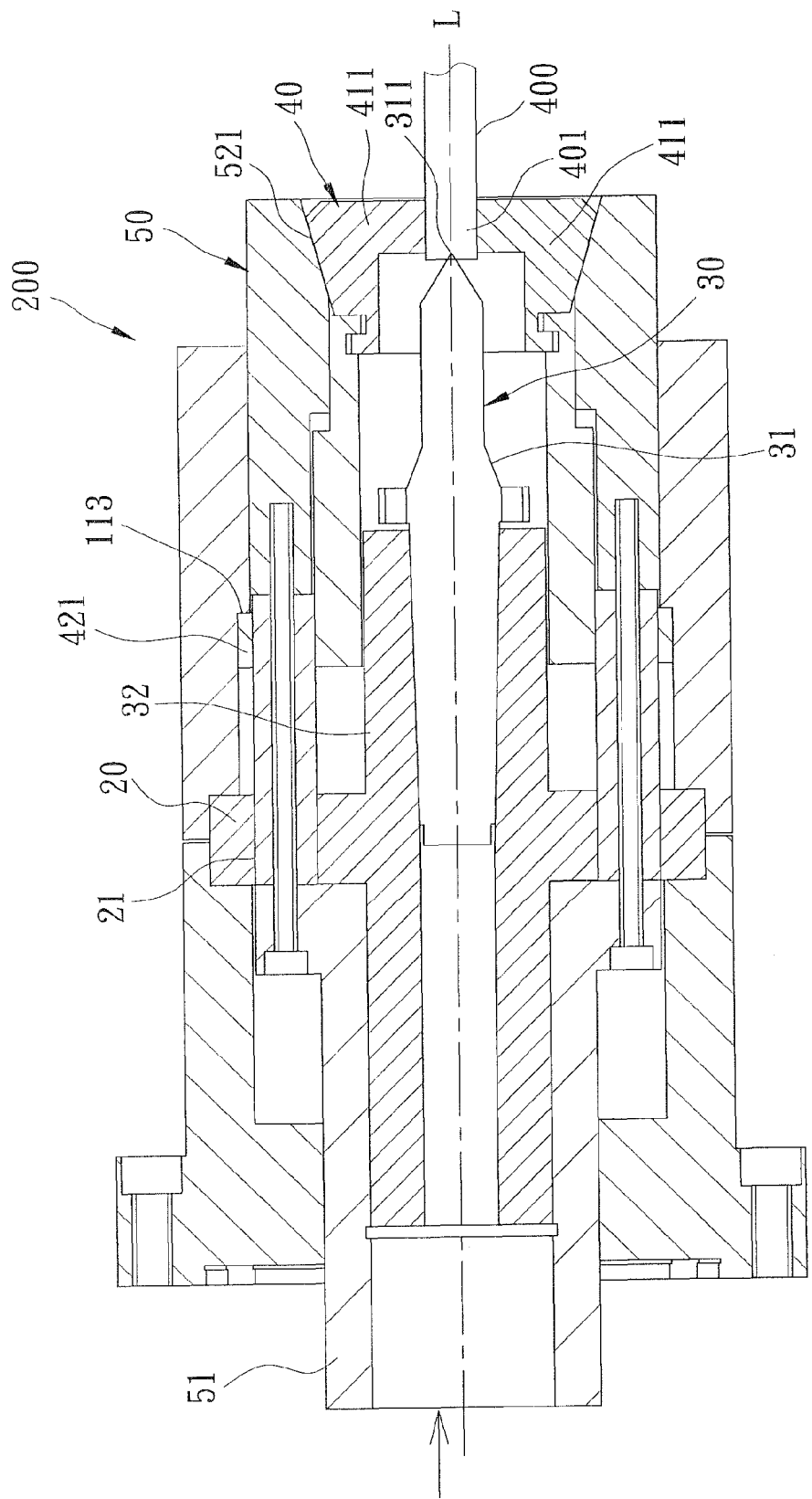
FIG. 4 is a schematic sectional view showing the first chuck device of the preferred embodiment when operated in a clamping state.

The first sleeve unit 50 is disposed movably in the first axial hole 11 in the first tubular housing 10, is concentric with the first tubular housing 10, and is sleeved on the first chuck unit 40. In this embodiment, the first sleeve unit 50 includes a first sleeve 51 disposed movably in the first hole portion 111 of the first axial hole 11 in the first tubular housing 10, a second sleeve 52 opposite to the first sleeve 51 in the direction (X), disposed movably in the second hole portion 112 of the first axial hole 11 in the first tubular housing 10 and having a first pushing end portion 521 sleeved on and abutting against the first chuck member 41 of the first chuck unit 40, and a plurality of connecting rods 53 interconnecting the first and second sleeves 51, 52 by means of a plurality of screw fasteners and extending respectively through the through holes 21 in the first positioning disc 20 and through the holes 422 in the annular flange 421 of the driven sleeve 42 such that the annular flange 421 of the driven sleeve 42 is disposed between the first positioning disc 20 and the second sleeve 52. In this embodiment, the first pushing end portion 521 of the second sleeve 52 has an inclined annular inner face 5211 that defines an outwardly and gradually diverging hole portion and that abuts against the first chuck member 41 of the first chuck unit 40. The first sleeve unit 50 is operable to move relative to the first tubular housing 10 along the hole axis (L) such that the first chuck member 41 of the first chuck unit 40 is driven by the first pushing end portion 521 of the second sleeve 52 with movement of the first sleeve unit 50 to move away from the first tubular housing 10 until the annular flange 421 of the driven sleeve 42 of the first chuck unit 40 abuts against the annular shoulder portion 113 of the first tubular housing 10, as shown in FIG. 3. In this case, the jaw arms 411 of the first chuck member 41 are disposed spacedly around the end 401 of the workpiece 400. Thereafter, when the first sleeve unit 50 is further moved toward the workpiece 400 until the first sleeve 51 abuts against the first positioning disc 20, the jaw arms 411 of the first chuck member 41 are driven by the first pushing end portion 521 of the second sleeve 52 of the first sleeve unit 50 to move toward the end 401 of the workpiece 400, thereby clamping the end 401 of the workpiece 400, as shown in FIG. 4.

Figure 5:
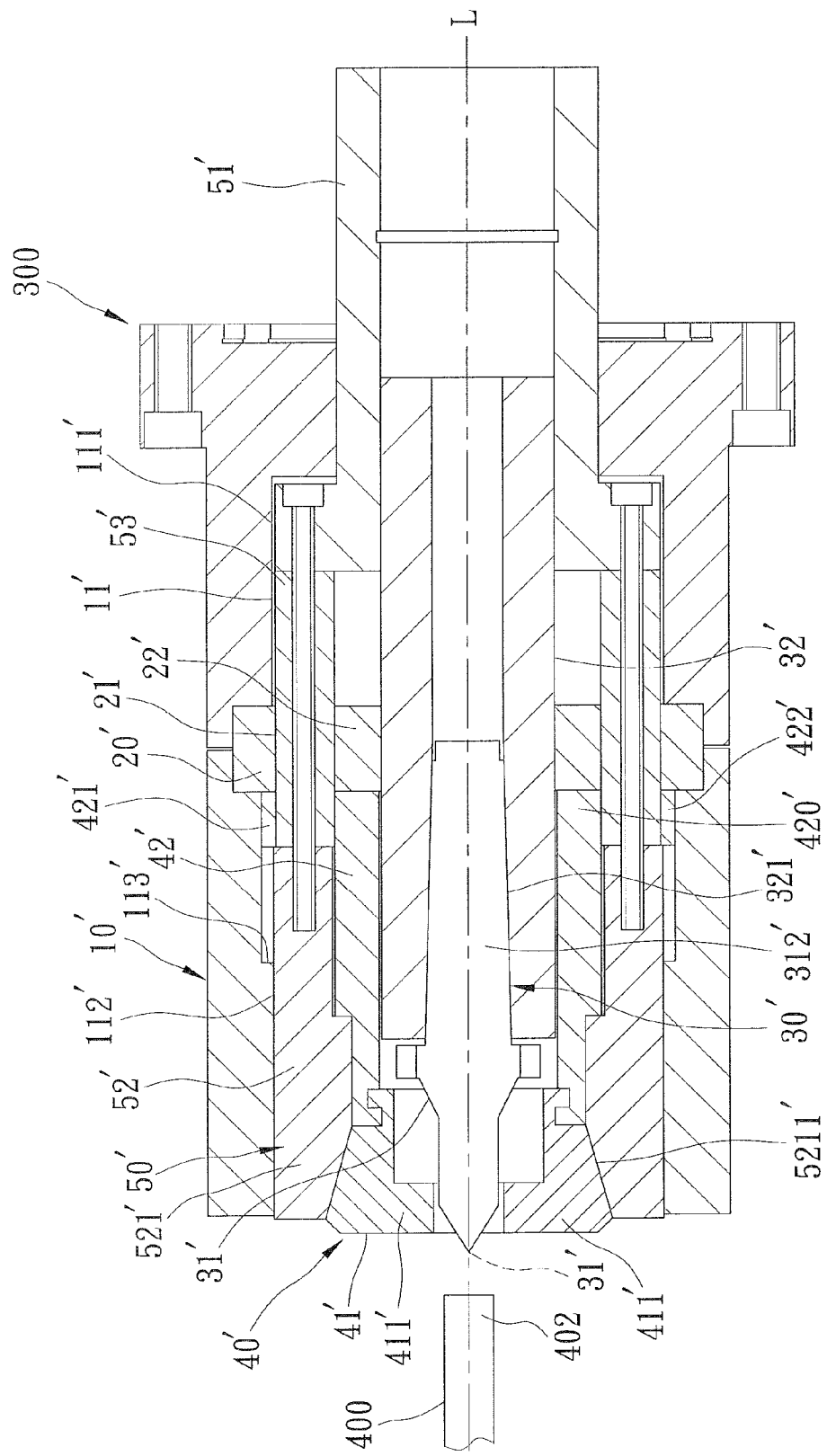
FIG. 5 is a schematic sectional view showing a second chuck device of the preferred embodiment when operated in a normal state.

Referring further to FIG. 5, the second chuck device 300 is mounted on the second side 102 of the machine 100, and includes a second tubular housing 10', a second positioning disc 20', a second center unit 30', a second chuck unit 40', and a second sleeve unit 50'.

The second tubular housing 10' is formed with a second axial hole 11' with the hole axis (L).

The second positioning disc 20' is disposed fixedly in the second axial hole 11' such that the second axial hole 11' is divided into a first hole portion 111' and a second hole portion 112' by the second positioning disc 20', is concentric with the second tubular housing 10', and is formed with a center through hole 22', and a plurality of through holes 21' disposed around the center through hole 22'. It is noted that the second tubular housing 10' has an annular inner surface defining the second axial hole 11' and having an annular shoulder portion 113' that is disposed in the second hole portion 112'.

Figure 6:
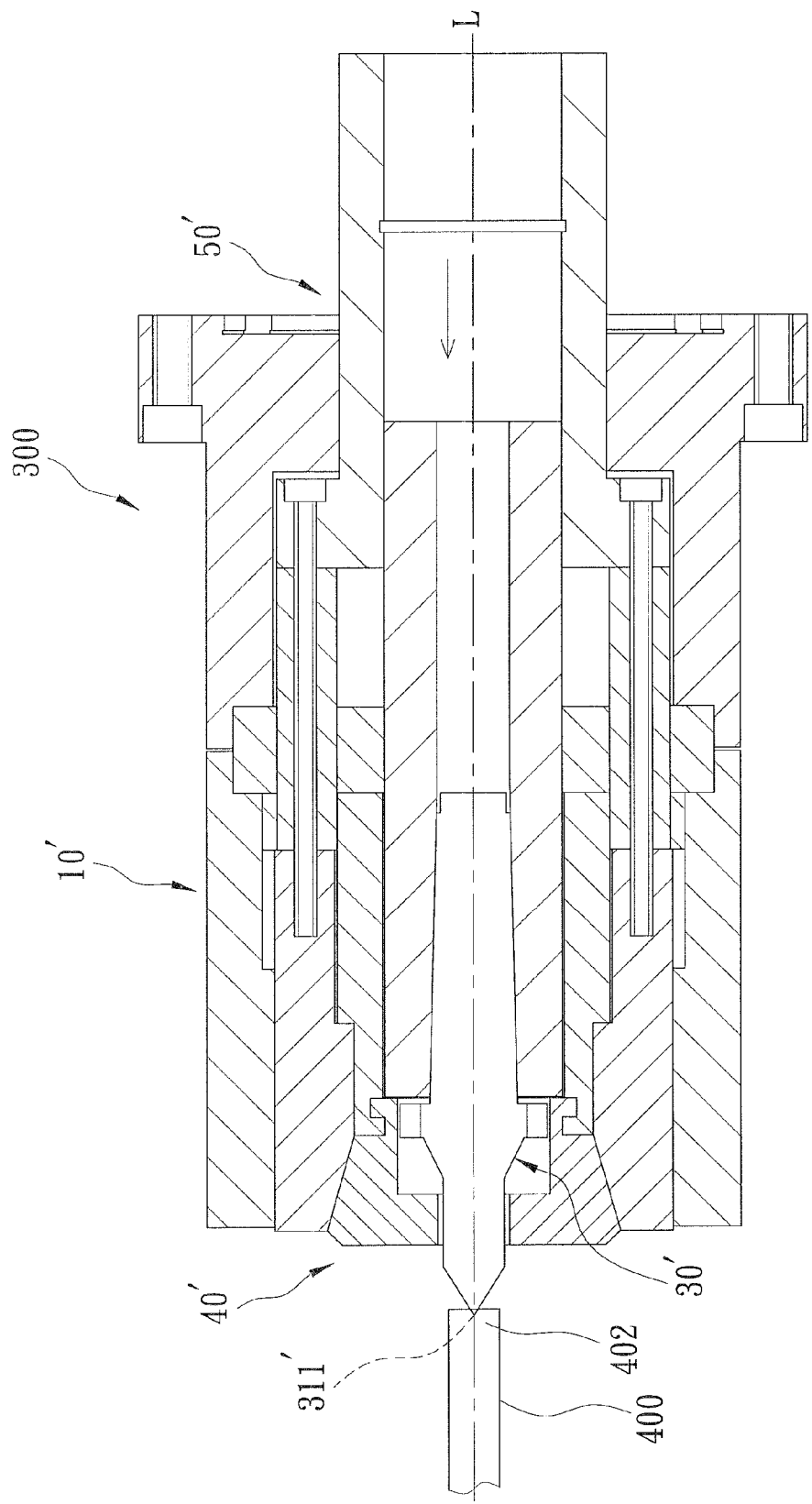
FIG. 6 is a schematic sectional view showing the second chuck device of the preferred embodiment when a second center unit is moved from a normal position to an abutting position.

The second center unit 30' is disposed movably in the second axial hole 11', and extends along the hole axis (L) In this embodiment, the second center unit 30' includes a second center rod 31' and a second center-mounting seat 32'. The second center-mounting seat 32' is in the form of an elongate tube body that is concentric with the second tubular housing 10', extends along the hole axis (L) through the center through hole 22' in the second positioning disc 20'. The second center rod 31' extends along the hole axis (L), and has a second tip 311', and a mounting end portion 312' opposite to the second tip 311' in the direction (X), and inserted into and engaging a tapered mounting hole 321' in the second center-mounting seat 32'. The second center unit 30' is operable to move relative to the second tubular housing 10' along the hole axis (L) between a normal position (see FIG. 5), where the second tip 311' is spaced apart from the other end 402 of the workpiece 400, and an abutting position (see FIG. 6), where the second tip 311' is moved toward the first chuck device 200 so as to abut against a center of the other end 402 of the workpiece 400.

The second chuck unit 40' is disposed movably in the second hole portion 112' of the second axial hole 11' in the second tubular housing 10', and is sleeved on the second center unit 30'. The second chuck unit 40' includes a second chuck member 41' disposed around the second center rod 31' and adjacent to the second tip 311', and a driven sleeve 42' sleeved movably on the second center-mounting seat 32', i.e., the tube body, connected to the second chuck member 41', and having an end 420' distal from the second chuck member 41', and an annular flange 421 extending outwardly and radially from the end 420', and formed with a plurality of holes 422' corresponding respectively to the through holes 21' in the second positioning disc 20'. In this embodiment, the second chuck member 41' includes a plurality of resilient jaw arms 411'.

Figure 7:
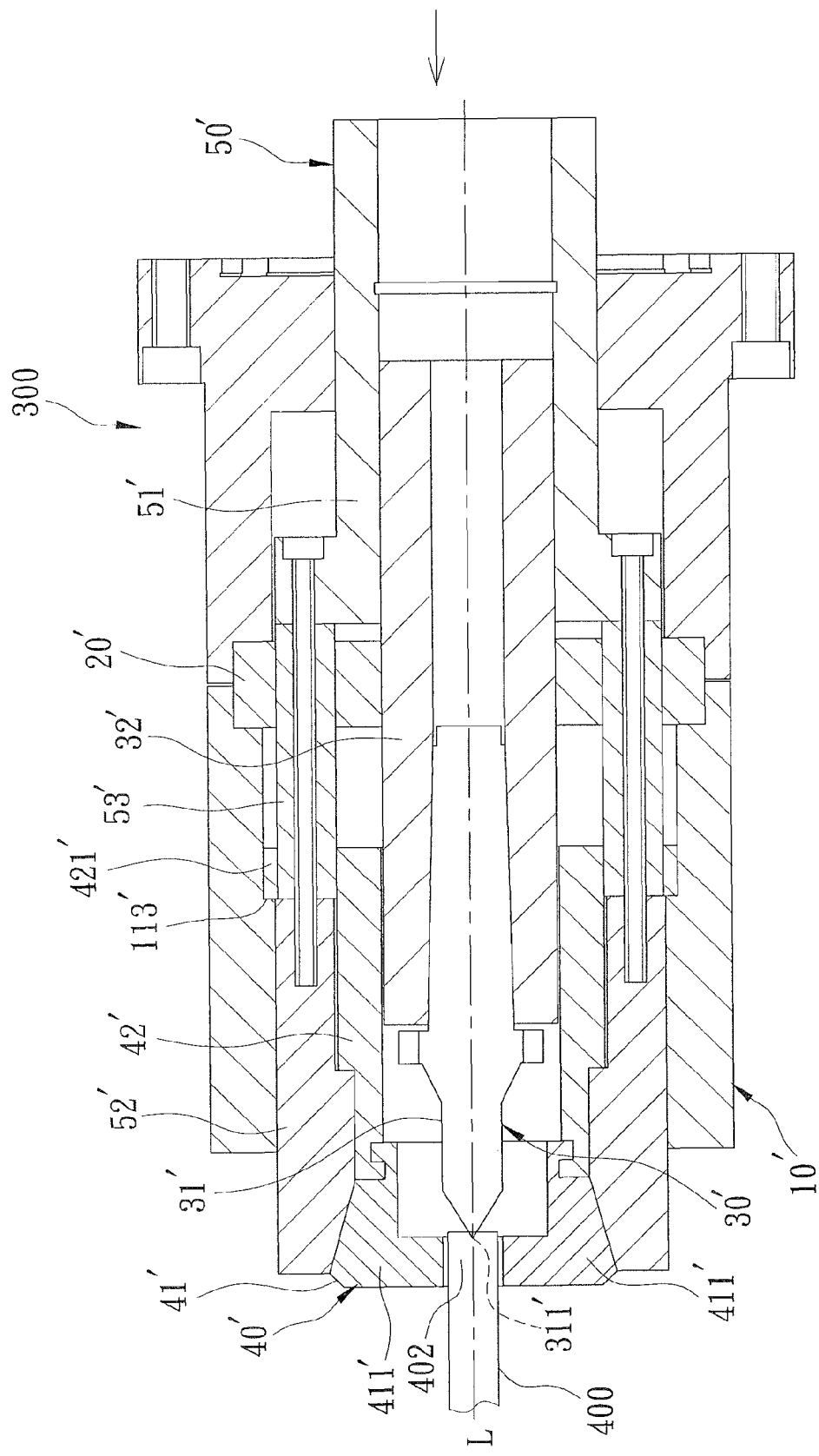
FIG. 7 is a schematic sectional view showing the second chuck device of the preferred embodiment when an assembly of a second chuck unit and a second sleeve unit of the second chuck device is moved toward a workpiece.
Figure 8:
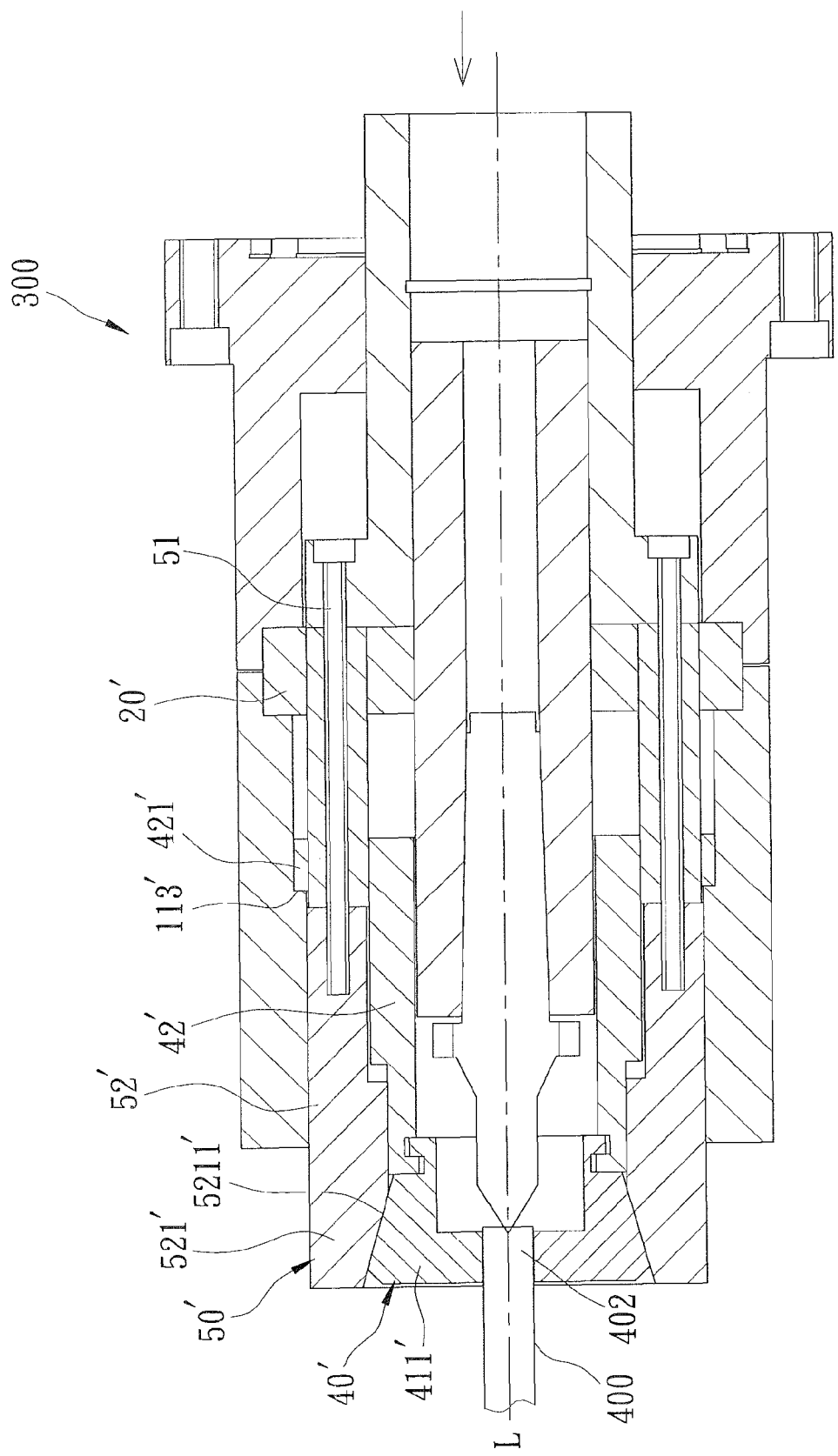
FIG. 8 is a schematic sectional view showing the second chuck device of the preferred embodiment when operated in a clamping state.

The second sleeve unit 50' is disposed movably in the second axial hole 11' in the second tubular housing 10', is concentric with the second tubular housing 10', and is sleeved on the second chuck unit 40'. In this embodiment, the second sleeve unit 50' includes a first sleeve 51' disposed movably in the first hole portion 111' of the second axial hole 11' in the second tubular housing 10', a second sleeve 52' opposite to the first sleeve 51' in the direction (X), disposed movably in the second hole portion 112' of the second axial hole 11' in the second tubular housing 10' and having a second pushing end portion 521' sleeved on and abutting against the second chuck member 41' of the second chuck unit 40', and a plurality of connecting rods 53' interconnecting the first and second sleeves 51', 52' by means of a plurality of screw fasteners and extending respectively through the through holes 21' in the second positioning disc 20' and through the holes 422' in the annular flange 421' of the driven sleeve 42' such that the annular flange 421' of the driven sleeve 42' is disposed between the second positioning disc 20' and the second sleeve 52'. In this embodiment, the second pushing end portion 521' of the second sleeve 52' has an inclined annular inner face 5211' that defines an outwardly and gradually diverging hole portion and that abuts against the second chuck member 41' of the second chuck unit 40'. The second sleeve unit 50' is operable to move relative to the second tubular housing 10' along the hole axis (L) such that the second chuck member 41' of the second chuck unit 40' is driven by the second pushing end portion 521' of the second sleeve 52' with movement of the second sleeve unit 50' to move away from the second tubular housing 10' until the annular flange 421' of the driven sleeve 42' of the second chuck unit 40' abuts against the annular shoulder portion 113' of the second tubular housing 10', as shown in FIG. 7. In this case, the jaw arms 411' of the second chuck member 41' are disposed spacedly around the other end 402 of the workpiece 400. Thereafter, when the second sleeve unit 50' is further moved toward the workpiece 400 until the first sleeve 51' abuts against the second positioning disc 20', the jaw arms 411' of the second chuck member 41' are driven by the second pushing end portion 521' of the second sleeve 52' of the second sleeve unit 50' to move toward the other end 402 of the workpiece 400, thereby clamping the other end 402 of the workpiece 400, as shown in FIG. 8.

Figure 9:
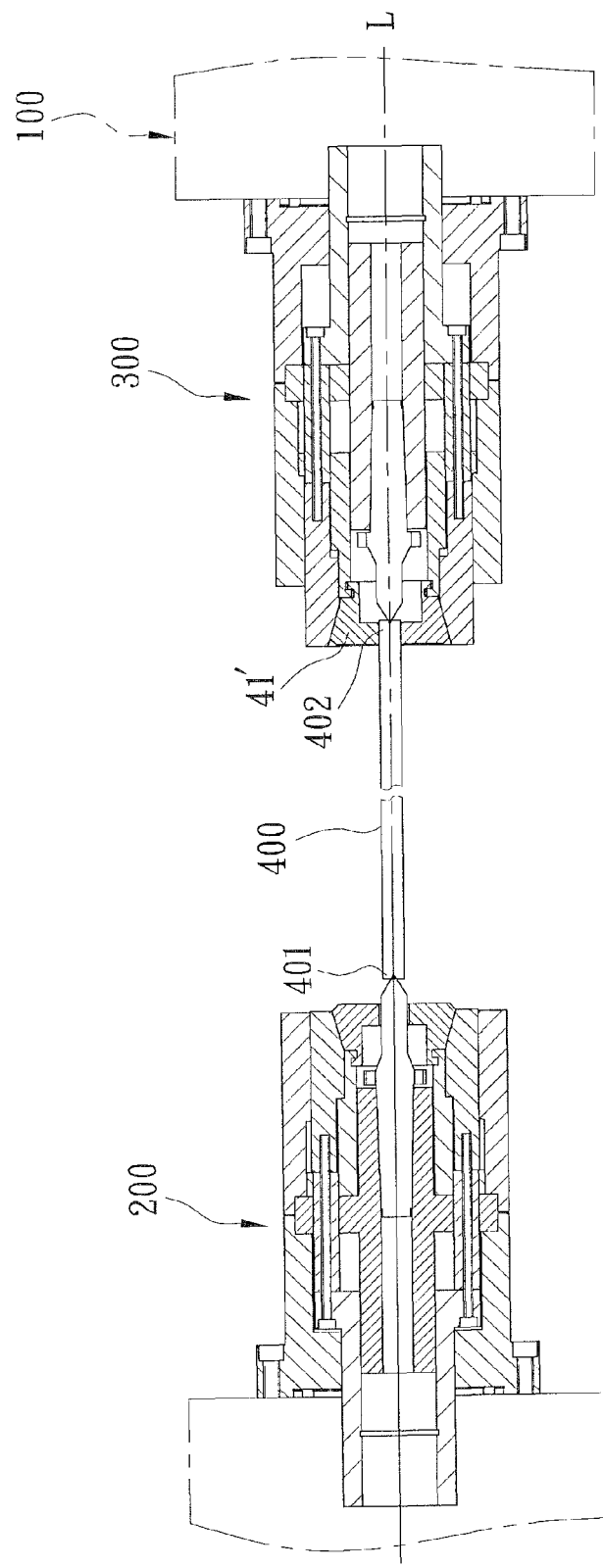
FIG. 9 is a fragmentary, partly schematic sectional view showing the preferred embodiment when operated in a first machining mode.
Figure 10:
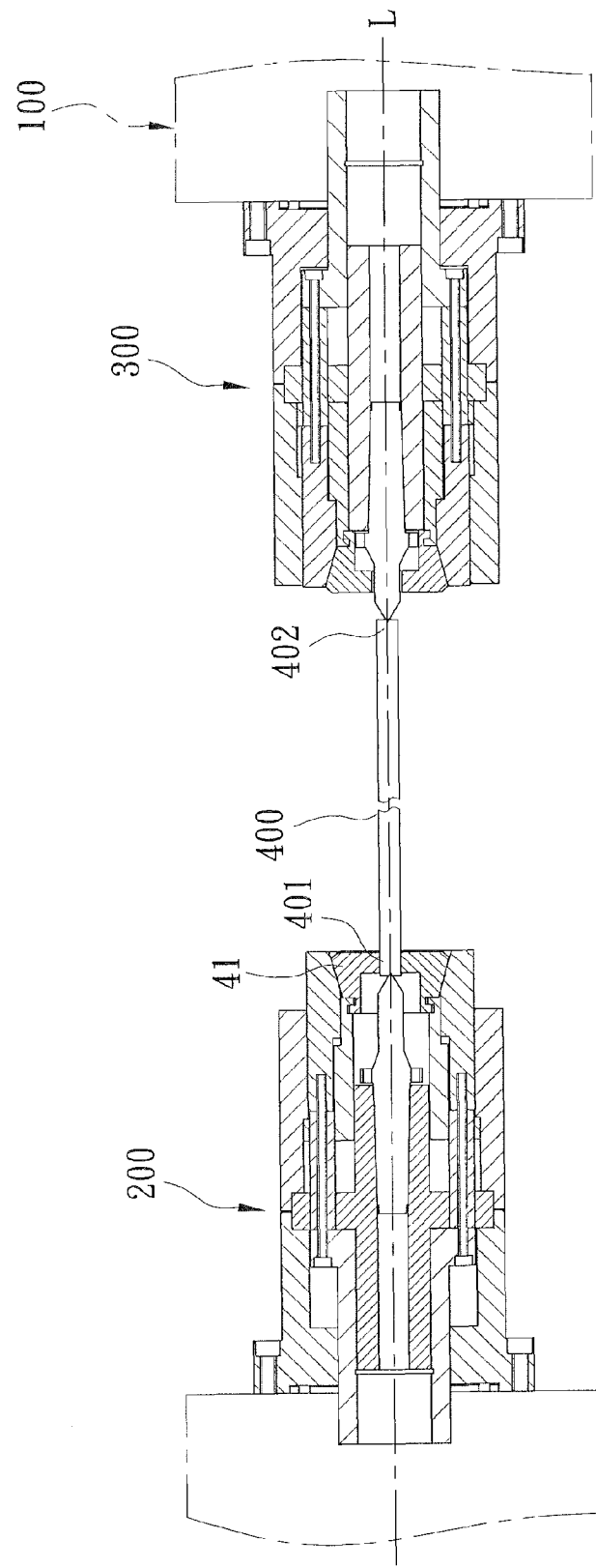
FIG. 10 is a fragmentary, partly schematic sectional view showing the preferred embodiment when operated in a second machining mode.

In use, the machine tool is operable between a first machining mode, where the other end 402 of the workpiece 400 is clamped by the second chuck member 41' of the chuck unit 40' of the second chuck device 300, as shown in FIG. 9, and a second machining mode, where the end 401 of the workpiece 400 is clamped by the first chuck member 41 of the chuck unit 40 of the first chuck device 200, as shown in FIG. 10. As a result, the workpiece 400 can be fully machined by the machine tool when operated in the first and second machining modes in turn.

In sum, since the machine tool of the present invention can be easily switched from the first machining mode to the second machining mode through control of the first and second chuck devices 200, 300, a workpiece required to be fully machined can be easily finished without manual detachment as encountered in the prior art, thereby resulting in convenience during use. Furthermore, since the first and second tips 311, 311' of the first and second center units 30, 30' are aligned with each other, accuracy for the same workpiece can be ensured.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A chuck device comprising:
    a tubular housing formed with an axial hole that has a hole axis;
    a center unit disposed in said axial hole in said tubular housing, extending along the hole axis, and having a tip extending outwardly of said tubular housing and adapted to abut against a center of an end of a workpiece;
    a chuck unit disposed movably in said axial hole in said tubular housing, sleeved on said center unit, and including a chuck member disposed adjacent to said tip of said center unit; and
    a sleeve unit disposed movably in said axial hole in said tubular housing, concentric with said tubular housing and sleeved on said chuck unit, said sleeve unit having a pushing end portion sleeved on and abutting against said chuck member of said chuck unit;
    wherein said sleeve unit is operable to move relative to said tubular housing along the hole axis such that said chuck member of said chuck unit is driven by said pushing end portion of said sleeve unit with movement of said sleeve unit to move away from said tubular housing and to clamp the end of the workpiece.

2. The chuck device as claimed in claim 1, further comprising a positioning disc disposed fixedly in said tubular housing such that said axial hole is divided into a first hole portion and a second hole portion by said positioning disc, concentric with said tubular housing and formed with a plurality of through holes, wherein:
said sleeve unit includes a first sleeve disposed movably in said first hole portion, a second sleeve disposed movably in said second hole portion and having said pushing end portion, and a plurality of connecting rods interconnecting said first and second sleeves and extending respectively through said through holes in said positioning disc; and
said chuck unit is disposed movably in said second hole portion, and further includes a driven sleeve connected to said chuck member and having an end distal from said chuck member, and an annular flange extending outwardly and radially from said end, disposed between said positioning disc and said second sleeve, and formed with a plurality of holes each permitting extension of a corresponding one of said connecting rods therethrough.

3. The chuck device as claimed in claim 2, wherein said center unit includes a center rod extending along the hole axis and having said tip, and a center-mounting seat for mounting said center rod thereto.

4. The chuck device as claimed in claim 3, wherein said center-mounting seat of said center unit is connected integrally to said positioning disc such that said center unit is fixed in said tubular housing.

5. The chuck device as claimed in claim 3, wherein:
said positioning disc is formed with a center through hole; and
said center-mounting seat is in the form of a tube body extending along the hole axis through said center through hole in said positioning disc and into said first sleeve of said sleeve unit and said driven sleeve of said chuck unit such that said center unit is movable relative to said tubular housing along the hole axis between a normal position, where said tip is spaced apart from the center of the end of the workpiece, and an abutting position, where said tip abuts against the center of the end of the workpiece.

6. A machine tool comprising:
a machine having first and second sides opposite to each other in a direction;
a first chuck device mounted on said first side of said machine, said first chuck device including
a first tubular housing formed with a first axial hole that has a hole axis parallel to the direction,
a first center unit disposed fixedly in said first axial hole in said first tubular housing, extending along the hole axis, and having a first tip extending outwardly of said first tubular housing and adapted to abut against a center of an end of a workpiece,
a first chuck unit disposed movably in said first axial hole in said first tubular housing, sleeved on said first center unit, and including a first chuck member disposed adjacent to said first tip of said first center unit, and
a first sleeve unit disposed movably in said first axial hole in said first tubular housing, concentric with said first tubular housing and sleeved on said first chuck unit, said first sleeve unit having a first pushing end portion sleeved on and abutting against said first chuck member of said first chuck unit, said first sleeve unit being operable to move relative to said first tubular housing along the hole axis such that said first chuck member of said first chuck unit is driven by said first pushing end portion of said first sleeve unit with movement of said first sleeve unit to move away from first tubular housing and to clamp the end of the workpiece; and
a second chuck device mounted on said second side of said machine, said second chuck device including
a second tubular housing formed with a second axial hole that has the hole axis,
a second center unit disposed movably in said second axial hole in said second tubular housing, extending along the hole axis and having a second tip, said second center unit being operable to move relative to said second tubular housing along the hole axis between a normal position, where said second tip is spaced apart from the other end of the workpiece, and an abutting position, where said second tip moves away from said second tubular housing and toward said first chuck device so as to abut against a center of the other end of the workpiece;
a second chuck unit disposed movably in said second axial hole in said second tubular housing, sleeved on said second center unit, and including a second chuck member disposed adjacent to said second tip of said second center unit, and
a second sleeve unit disposed movably in said second axial hole in said second tubular housing, concentric with said second tubular housing and sleeved on said second chuck unit, said second sleeve unit having a second pushing end portion sleeved on and abutting against said second chuck member of said second chuck unit, said second sleeve unit being operable to move relative to said second tubular housing along the hole axis such that said second chuck member of said second chuck unit is driven by said second pushing end portion of said second sleeve unit with movement of said second sleeve unit to move away from said second tubular housing and to clamp the other end of the workpiece.

7. The machine tool as claimed in claim 6, wherein:
said first chuck device further includes a first positioning disc disposed fixedly in said first tubular housing such that said first axial hole is divided into a first hole portion and a second hole portion by said first positioning disc, concentric with said first tubular housing and formed with a plurality of through holes;
said first sleeve unit of said first chuck device includes a first sleeve disposed movably in said first hole portion of said first axial hole, a second sleeve disposed movably in said second hole portion of said first axial hole and having said first pushing end portion, and a plurality of connecting rods interconnecting said first and second sleeves and extending respectively through said through holes in said first positioning disc;
said first chuck unit of said first chuck device is disposed movably in said second hole portion of said first axial hole, and further includes a driven sleeve connected to said first chuck member and having an end distal from said first chuck member, and an annular flange extending outwardly and radially from said end, disposed between said first positioning disc and said second sleeve of said first sleeve unit, and formed with a plurality of holes each permitting extension of a corresponding one of said connecting rods of said first sleeve unit therethrough;

said second chuck device further includes a second positioning disc disposed fixedly in said second tubular housing such that said second axial hole is divided into a first hole portion and a second hole portion by said second positioning disc, concentric with said second tubular housing and formed with a plurality of through holes;

said second sleeve unit of said second chuck device includes a first sleeve disposed movably in said first hole portion of said second axial hole, a second sleeve disposed movably in said second hole portion of said second axial hole and having said second pushing end portion, and a plurality of connecting rods interconnecting said first and second sleeves and extending respectively through said through holes in said second positioning disc; and said second chuck unit of said second chuck device is disposed movably in said second hole portion of said second axial hole, and further includes a driven sleeve connected to said second chuck member and having an end distal from said second chuck member, and an annular flange extending outwardly and radially from said end, disposed between said second positioning disc and said second sleeve of said second sleeve unit, and formed with a plurality of holes each permitting extension of a corresponding one of said connecting rods of said second sleeve unit therethrough.

8. The machine tool as claimed in claim 7, wherein:

said first center unit of said first chuck device includes a first center rod extending along the hole axis and having said first tip, and a first center-mounting seat connected integrally to said first positioning disc for mounting said first center rod thereto; and said second positioning disc of said second chuck device is formed with a center through hole; and said second center unit of said second chuck device includes a second center rod extending along the hole axis and having said second tip, and a second center-mounting seat for mounting said second center rod thereto, said second center-mounting seat being in the form of a tube body extending along the hole axis through said center through hole in said second positioning disc and into said first sleeve of said second sleeve unit and said driven sleeve of said second chuck unit such that said second center unit is movable relative to said second tubular housing along the hole axis.

* * * * *